(12) United States Patent
Hoshi

(10) Patent No.: US 9,738,194 B2
(45) Date of Patent: Aug. 22, 2017

(54) VEHICLE SEAT AND SEAT FRAME FOR SAME

(71) Applicant: TS TECH CO., LTD., Asaka-shi, Saitama (JP)

(72) Inventor: Masayuki Hoshi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 48 days.

(21) Appl. No.: 14/781,789

(22) PCT Filed: Apr. 8, 2013

(86) PCT No.: PCT/JP2013/060649
§ 371 (c)(1),
(2) Date: Oct. 1, 2015

(87) PCT Pub. No.: WO2014/167638
PCT Pub. Date: Oct. 16, 2014

(65) Prior Publication Data
US 2016/0039323 A1    Feb. 11, 2016

(51) Int. Cl.
*A47C 7/02*     (2006.01)
*B60N 2/68*     (2006.01)
(Continued)

(52) U.S. Cl.
CPC .............. *B60N 2/68* (2013.01); *B60N 2/449* (2013.01); *B60N 2/7041* (2013.01); *B60N 2/72* (2013.01); *B60N 2/682* (2013.01); *B60N 2/686* (2013.01)

(58) Field of Classification Search
CPC .......... B60N 2/682; B60N 2/686; B60N 2/72; B60N 2/68; B60N 2/7041; B60N 2/449
(Continued)

(56) References Cited

U.S. PATENT DOCUMENTS

| | | | | |
|---|---|---|---|---|
| 5,897,168 A | * | 4/1999 | Bartelt | B60N 2/68 29/897.2 |
| 6,371,561 B1 | * | 4/2002 | Iwamoto | B60N 2/68 297/452.18 |

(Continued)

FOREIGN PATENT DOCUMENTS

| JP | 53-079104 U1 | 7/1978 |
|---|---|---|
| JP | 2003-205188 A | 7/2003 |

(Continued)

OTHER PUBLICATIONS

Office Action issued in related application JP 2015-510985, Dec. 13, 2016, with machine generated English language translation, 6 pages.

*Primary Examiner* — Chi Q Nguyen
(74) *Attorney, Agent, or Firm* — Drinker Biddle & Reath LLP

(57) ABSTRACT

A vehicle seat and frame thereof which minimize the size of an attachment mechanism of a support structure for supporting the back of a seated person are provided. A seat frame has side frames positioned at right and left sides of a seat back frame and extending in an up to down direction. The side frame has a side portion extending along a side portion of the seat, a rear portion projecting from a rear end of the side portion to an inner side of the seat, and a support member spanned between the right and left side frames, and receives a load of the seated person. The support member has a connecting portion for connecting to the side frame and is attached to the rear portion of the side frame in a state where the positional relationship between the connecting portion and the side frame is fixed.

4 Claims, 7 Drawing Sheets

(51) Int. Cl.
*B60N 2/72* (2006.01)
*B60N 2/44* (2006.01)
*B60N 2/70* (2006.01)

(58) Field of Classification Search
USPC ............ 297/452.18, 452.34, 425.33, 452.29, 297/452.23, 452.22, 452.33
See application file for complete search history.

(56) References Cited

U.S. PATENT DOCUMENTS

| | | | | |
|---|---|---|---|---|
| 2001/0005096 A1* | 6/2001 | Nagayasu | ................. | A47C 7/28 297/452.18 |
| 2002/0030392 A1* | 3/2002 | Kitagawa | ............. | B60N 2/4249 297/216.13 |
| 2012/0112512 A1* | 5/2012 | Sakai | ................... | B60N 2/7017 297/452.18 |
| 2013/0113246 A1* | 5/2013 | Kaku | ................... | B60N 2/4228 297/216.14 |
| 2013/0119715 A1* | 5/2013 | Medoro | ................. | B60N 2/686 297/180.1 |
| 2013/0257117 A1* | 10/2013 | Seki | ...................... | B60N 2/4228 297/216.1 |
| 2013/0270878 A1* | 10/2013 | Adachi | ................ | B60N 2/4228 297/216.14 |
| 2014/0103626 A1* | 4/2014 | Seki | ...................... | B60N 2/4228 280/730.2 |
| 2014/0224553 A1* | 8/2014 | Ozawa | ................... | B60N 2/002 177/136 |
| 2015/0032037 A1* | 1/2015 | Nakano | ................... | B60N 2/448 601/46 |
| 2015/0367762 A1* | 12/2015 | Yasuda | ............... | B60N 2/42745 297/216.14 |

FOREIGN PATENT DOCUMENTS

| | | |
|---|---|---|
| JP | 2005-138675 A | 6/2005 |
| JP | 2013-010453 A | 1/2013 |
| TW | 200716405 A | 5/2007 |

\* cited by examiner

VEHICLE SEAT AND SEAT FRAME FOR SAME

CROSS REFERENCE TO RELATED APPLICATIONS

This application is a National Stage Entry application of PCT Application No. PCT/JP2013/060649, filed Apr. 8, 2013, the contents being incorporated herein by reference.

BACKGROUND

Disclosed herein is a vehicle seat and a seat frame thereof.

A structure where a plate-shaped pressure receiving member of resin is arranged at a position corresponding to the back of a seated person between side frames of a seat back and both right and left ends of the pressure receiving member are attached to the right and left side frames by two of upper and lower wires, is utilized as a support structure for supporting the back of the seated person on a vehicle seat (for example, Japanese Patent Document No. 2013-010453A, ¶¶0036 to 0037, FIG. 2, FIG. 3 ("the '453 Document")).

In the '453 Document, both ends of the upper wire are attached to lower portions of a substantially reversed U-shaped upper frame which connects upper ends of the right and left side frames.

Further, both ends of the lower wire are attached to right and left link members which are arranged at inner surfaces of the right and left side frames. These link members receive an impact load transmitted via the lower wire and move rearward; thereby, a lower portion of the pressure receiving member can be moved rearward.

In the '453 Document, as described above, both ends of the lower wire are attached to the side frames by the link members; therefore, a sufficient amount of rearward depression of the back of the seated person at the time of a rear-end collision can be secured.

However, in the '453 Document, both ends of the lower wire are connected to the link members; therefore, an attachment mechanism of the support structure for supporting the back of a seated person is large.

SUMMARY

Various embodiments of the present invention disclosed herein are made in view of the foregoing, and the object of them is to provide a vehicle seat and a seat frame thereof which inhibit the attachment mechanism of the support structure for supporting the back of a seated person from increasing in size.

According to an embodiment, the foregoing problem is solved by a seat frame of a vehicle seat, the seat frame including side frames positioned at right and left sides of a seat back frame to extend in an up to down direction, each of the side frames including: a side portion extending along a side portion of the seat; a rear portion protruding from a rear end of the side portion to an inner side of the seat; and a support member spanned between the side frames at the right and left sides to receive a load of a seated person, which is applied onto to a backrest, the support member including a connecting portion for connecting to the side frame, the support member being attached to the rear portion of the side frame in a state where a positional relation between the connecting portion and the side frame is fixed.

According to an embodiment, the foregoing problem is solved by a vehicle seat including: side frames positioned at right and left sides of a seat back frame to extend in an up to down direction, each of the side frames including: a side portion extending along a side portion of the seat; a rear portion protruding from a rear end of the side portion to an inner side of the seat; and a support member spanned between the side frames at the right and left sides to receive a load of a seated person, which is applied onto to a backrest, the support member including a connecting portion for connecting to the side frame, the support member being attached to the rear portion of the side frame in a state where a positional relation between the connecting portion and the side frame is fixed.

As described above, the support member includes the connecting portion for connecting to the side frame, and the support member is attached to the rear portion of the side frame in a state where the positional relation between the connecting portion and the side frame is fixed. Therefore, an attachment portion of the support member to the side frame is inhibited from increasing in size and the compact and lightweight attachment portion of the support member can be provided.

Further, the support member is attached to the rear portion of the side frame; therefore, a distance from the support member to the attachment portion is shortened. As a result, a stable support by the support member can be realized.

In addition, an attachment member for attaching the connecting portion of the support member may be arranged at the rear portion.

With such configuration, the flexibility in selection of structures of the attachment portion for attaching the connecting portion of the support member increases; therefore, working efficiency in attaching of the support member can be easily improved. Moreover, the rear portion of the side frame does not need to be directly processed so that the connecting portion of the support member is attached to the side frame; therefore, processing of the side frame is simplified.

Further, the attachment member protrudes further to the inner side of the seat than the rear portion, and a support member connecting portion to which the support member is to be attached is arranged at a protruding portion of the attachment member.

With such configuration, it is only necessary to attach the support member to the protruding portion protruding further to the inner side of the seat than the side frame. Therefore, the attaching operation is facilitated and working efficiency in attaching of the support member is improved.

Furthermore, the attachment member may include: a side frame fixing portion to be fixed to the rear portion of the side frame; a forward extending portion curved at and extending from an inner end of the side frame fixing portion to a front side of the seat; and an inward extending portion extending from an end of the forward extending portion to the inner side of the seat, the end being in the opposite direction from the side frame fixing portion.

With such a configuration, interference between the side frame and the attachment member is inhibited. In addition, the support member connecting portion of the attachment member is arranged at a position protruded further forward than a surface of the rear portion of the side frame, therefore increasing the attachment working efficiency.

Moreover, the rear portion includes a forward protruding flange portion provided at an inner end of the surface extending in a seat width direction, and the forward extending portion protrudes to the front side of the seat along the flange portion and is extended further to the front side of the seat than a front end of the flange portion, the forward extending portion being bent at a front side of the front end of the flange portion to continuously connect to the support member connecting portion.

With such a configuration, even in a case where the side frame is provided with the flange portion at the end of the rear portion, interference between the flange portion and the attachment member is inhibited. In addition, the attachment member is shaped to extend from the rear portion along the flange portion; therefore, the attachment member is inhibited from increasing in size.

According to various embodiments, the support member includes the connecting portion for connecting to the side frame, and the support member is attached to the rear portion of the side frame in a state where the positional relation between the connecting portion and the side frame is fixed. Therefore, an attachment portion of the support member to the side frame is inhibited from increasing in size and the compact and lightweight attachment portion of the support member can be provided.

Further, the support member is attached to the rear portion of the side frame; therefore, a distance from the support member to the attachment portion is shortened. As a result, a stable support by the support member can be realized.

BRIEF DESCRIPTION OF DRAWINGS

Various embodiments of the invention are illustrated in the drawings, in which.

DETAILED DESCRIPTION

Hereinafter, an embodiment of the present invention will be described with reference to the drawings. In addition, member, arrangements, or the like described below do not restrict the present invention and various modification can be made to the member, the arrangement, or the like in accordance with the purpose of the present invention.

Further, in the present specification, an impact load at the time of a rear-end collision is an energy caused by a large load generated at the time of the rear-end rear collision, and the impact load involves a large rear-end collision caused by a passenger vehicle moving from behind, a large impact at the time of backward driving of a vehicle, or the like. The impact load does not include an energy caused by a load within a load region, which is similar to a load generated when a seat is in a normal seated position. Furthermore, the load generated when the seat is in the normal seated position here includes a seating load generated when an occupant sits on the seat, a load at acceleration, which is generated by a sudden acceleration of a passenger vehicle, or the like.

In the present specification, a vehicle includes on-road driving vehicles having wheels, such as an automobile, and a railroad vehicle, and corresponds to a moving vehicle in which a seat can be installed.

Further, a right to left direction, a front to back direction, an up to down direction, and a seat width direction respectively correspond to a right to left direction, a front to back direction, an up to down direction, and a right-to-left width direction of a vehicle seat S. Furthermore, inner and outer sides correspond to inner and outer sides of the vehicle seat S, respectively. A longitudinal direction and a width direction of an attachment member 42, 42' corresponding to a length direction thereof and a direction perpendicular to the length direction of the attachment member 42, 42' are respectively an up to down direction and a horizontal direction when the attachment member 42, 42' is attached to a side frame 15.

Basic Configuration of Vehicle Seat S

The vehicle seat S according to an embodiment of the present invention will be described with reference to FIG. 1 to FIG. 6.

Figure 1:
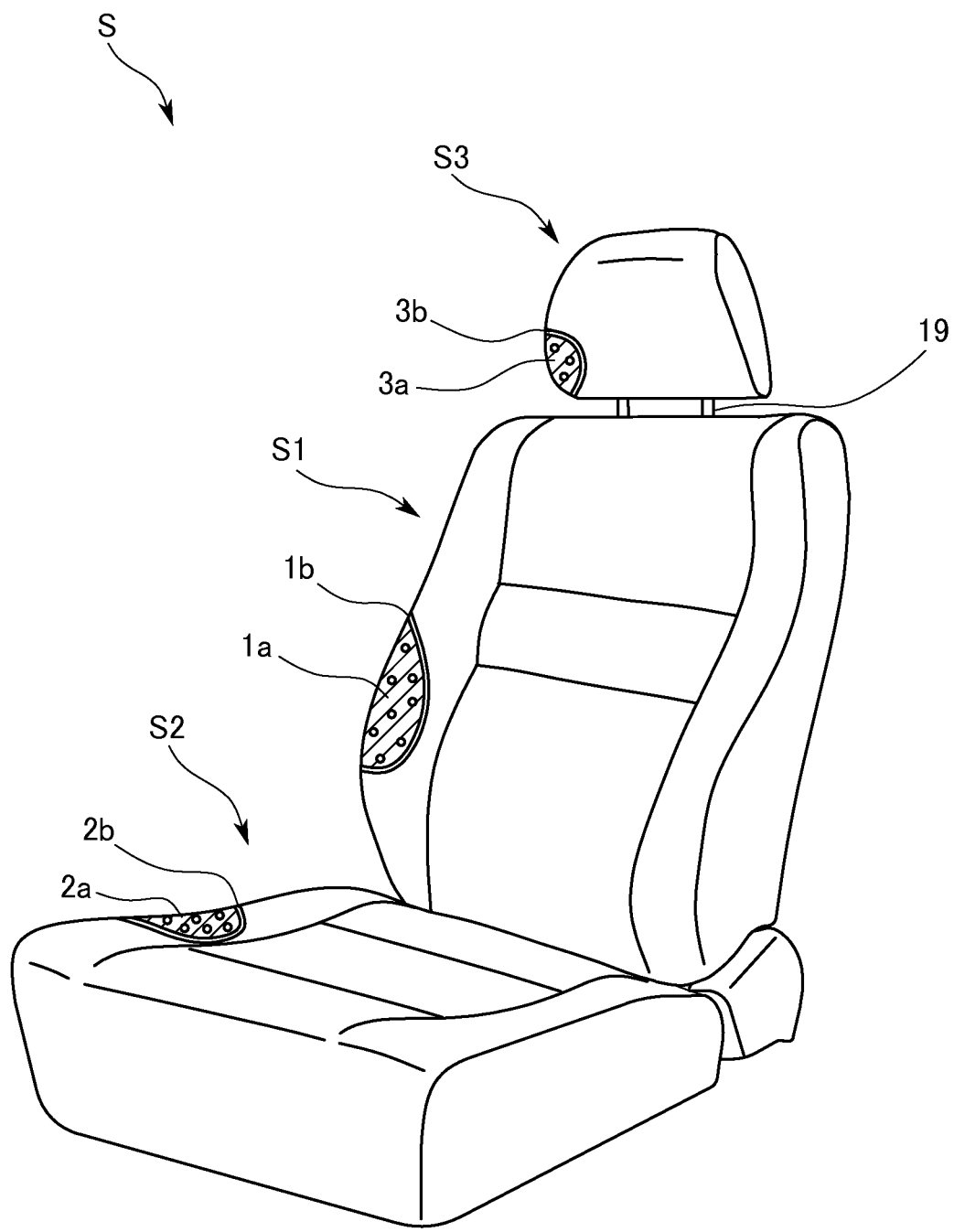
FIG. 1 is a schematic perspective view of a vehicle seat according to an embodiment of the present invention.

As shown in FIG. 1, the vehicle seat S is configured by a seat back S1, a seating portion S2, and a headrest S3. The seat back S1 is configured so that a cushion pad 1a mounted on a seat frame F is covered by a surface material 1b and the seating portion S2 is configured so that a cushion pad 2a mounted on the seat frame F is covered by a surface material 2b. The headrest S3 is configured so that a cushion pad 3a disposed at a core material (not shown) is covered by a surface material 3b. In addition, reference number 19 indicates a headrest pillar which supports the headrest S3.

The seat frame of the vehicle seat S is configured by a seat back frame 1 which configures the seat back S1 shown in FIG. 1 and by a publicly known seating frame (not shown) which configures the seating portion S2.

The seat back S1 is configured so that the cushion pad 1a mounted on the seat back frame 1 is covered by the surface material 1b from above the cushion pad 1a, and it serves to support the back of an occupant from behind. In addition, the seat back frame 1 according to the embodiment is configured to deform (incline rearward) when an impact load is applied to the seat back frame 1a t the time of a rear-end collision or the like, therefore absorbing the impact energy.

Figure 2:
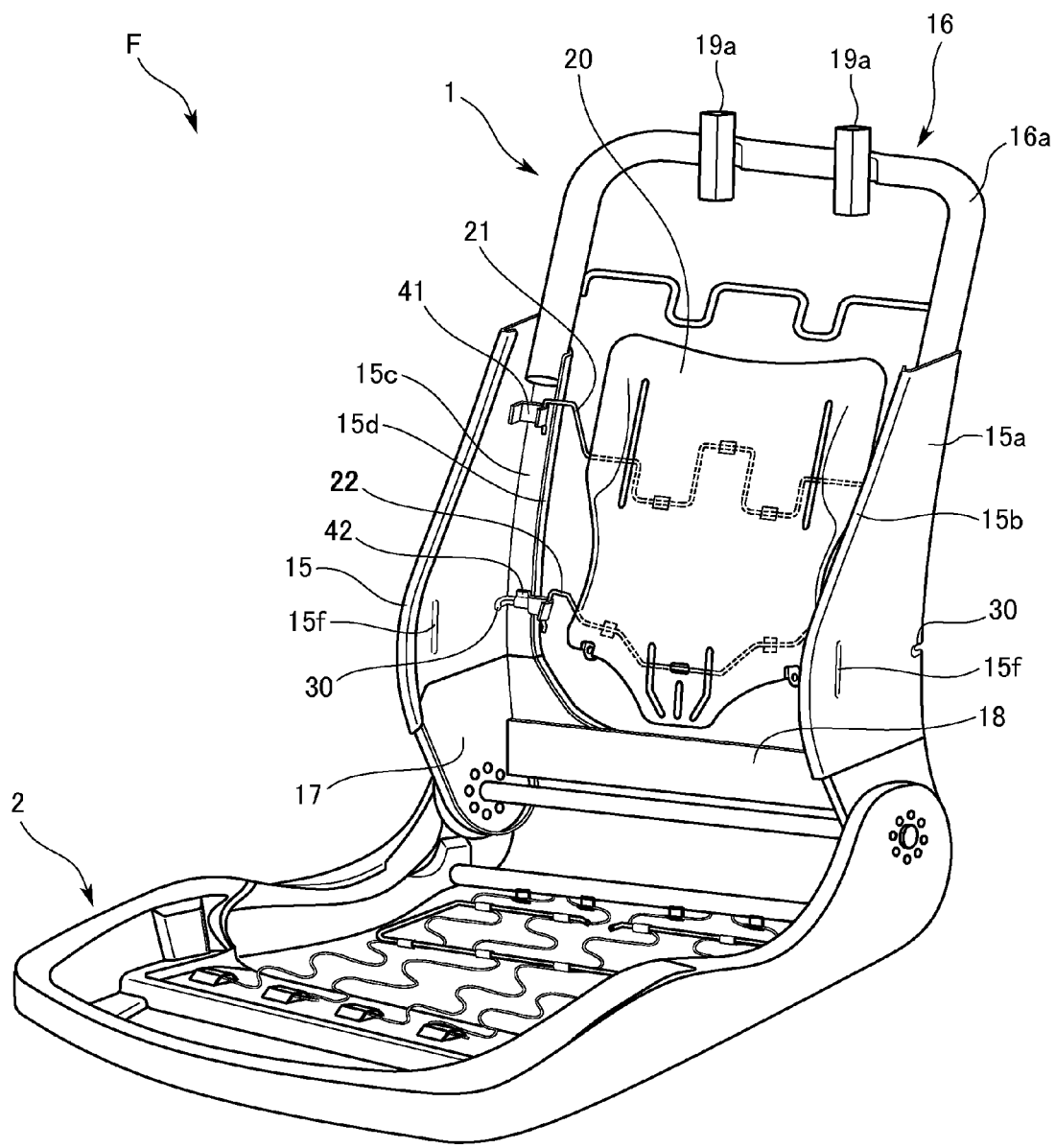
FIG. 2 is a schematic perspective view of a seat frame according to the embodiment of the present invention.

In the embodiment, the seat back frame 1 is a substantially rectangular frame body as shown in FIG. 2 and is equipped with side frames 15, an upper frame 16, and a lower frame which is configured by lower frame base portions 17 and a lower frame horizontally spanned portion 18.

A pair of side frames 15 is arranged to be separated from each other in the right to left direction and to extend in the up to down direction. The upper frame 16 which connects upper end portions of the pair of side frames 15 extends upward from the side frames 15. The upper frame 16 is extended upward from one of the side frames 15 to be thereafter bent and extended to the other of the side frames 15.

The upper frame 16 is obtained by bending a metallic pipe into a substantially reversed U-shape as shown in FIG. 2. Side portions 16a extending in the up to down direction at both sides of the upper frame 16 are arranged to partially overlap side plates 15a of the side frames 15 along the up to down direction. The upper frame 16 is fixedly connected via such overlapped portions to the side frames 15.

Pillar supporting portions 19a for attaching the headrest pillars 19 of FIG. 1 are fixed by welding to an upper portion of the upper frame 16, which extends in the right to left direction.

A metallic plate is pressed to form the side frame 15. The side frame 15 is formed by a substantially plate-shaped body curved so that a lower width is larger than an upper width. As shown in FIG. 2, the side frame 15 includes the flat plate-shaped side plate 15a serving as a side portion, a front edge portion 15b curved inward and rearward from a front end of the side plate 15a into a U-shape, and a rear edge portion 15c serving as a rear portion bent inward from a rear end of the side plate 15a into an L-shape.

A flange portion 15d extending forward and inward in a bent manner is formed at an inner end of the rear edge portion 15c in the seat width direction.

Figure 3:
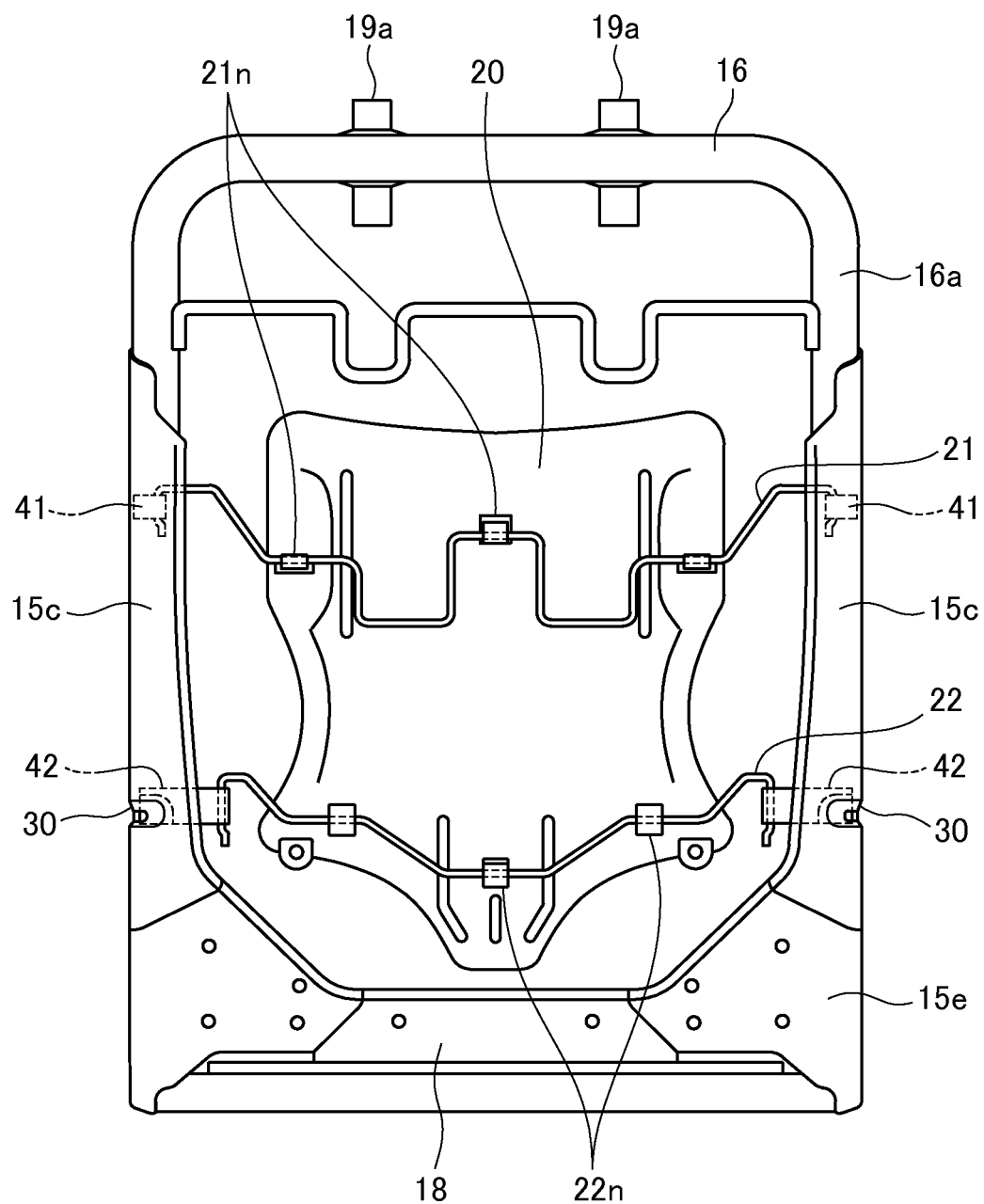
FIG. 3 is a back view of a seat back frame according to the embodiment of the present invention.

Widened portions 15e wider toward the lower are arranged at lower ends of a right and left pair of rear edge portions 15c as shown in FIG. 2 and FIG. 3. An inner end of the widened portion 15e is inclined further inward of the seat toward the lower. The side frame 15 is continuously connected via the widened portion 15e to the lower frame horizontally spanned portion 18.

As shown in FIG. 2, fragile portions 30 from which the side frames 15 are bent at the time of a rear-end collision or the like are formed at the right and left side frames 15 in a bilateral symmetry to be provided at lower portions of the side frames 15, i.e., at outer rear ends of the side frames 15, the outer rear ends being slightly above the widened portions 15e. The fragile portion 30 is configured by a hole portion 31 and a projected portion 32 which is formed around the hole portion 31.

Figure 4:
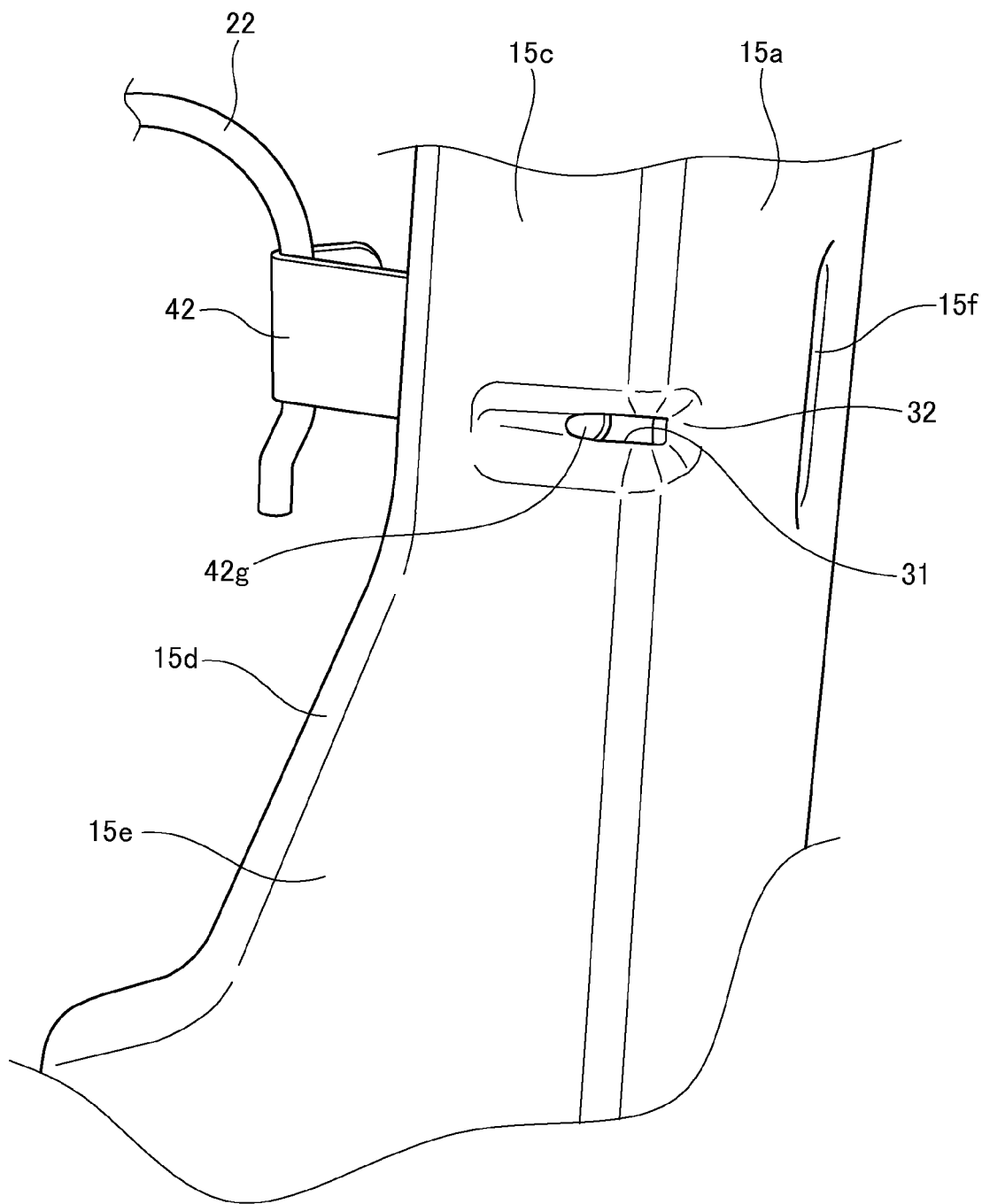
FIG. 4 is a back perspective view illustrating a positional relation between a fragile portion and an attachment member according to the embodiment of the present invention.

As shown in FIG. 4, the hole portion 31 is formed in a position which is at the lower portion of the side frame 15 and at which the side plate 15a intersects with the rear edge portion 15c. The hole portion 31 is formed by a strip-shaped through hole which horizontally extends in an elongated manner from a position rearward of an intermediate portion of the side plate 15a to a position outward of an intermediate portion of the rear edge portion 15c.

The projected portion 32 extending in a strip shape is formed in an area around the hole portion 31 of the side frame 15 to surround the hole portion 31.

The periphery portion of the hole portion 31 in the side frame 15 is curved and projected inward of the seat or forward of the seat from surfaces of other portions of the side frame 15, thereby forming the projected portion 32. The projected portion 32 extends substantially horizontally from a position forward of a front end of the hole portion 31 of the side plate 15a to a position inward of an inner end of the hole portion 31 of the rear edge portion 15c.

That is, the hole portion 31 is arranged at the most projected position in the projected portion 32.

A bead 15f is arranged at a front portion of the side plate 15a to be positioned on the same level as the fragile portion 30 and to extend along the front edge portion 15b. A surface of the side plate 15a is curved and projected inward of the seat, thereby forming the bead 15f.

Configuration of Pressure Receiving Member 20

A pressure receiving member 20 which supports the cushion pad 1a from behind and wires 21, 22 which connect the pressure receiving member 20 to the side frames 15 are arranged in an inner area located between the both side frames 15 and defined by the seat back frame 1. The pressure receiving member 20 and the wire 22 correspond to a support member in the embodiments.

The pressure receiving member 20 of the embodiment is a member obtained by forming a resin into a plate-shaped, substantially rectangular shape. Smooth recessed and projected portions are formed on a surface of the pressure receiving member 20, which contacts the cushion pad 1a. As shown in FIG. 3, pawl portions 21n, 22n for locking the wires 21, 22 are formed at upper and lower portions of a back surface of the pressure receiving member 20.

The pressure receiving member 20 is supported on a back surface of the cushion pad 1a by the wires 21, 22.

The wires 21, 22 are spanned between the side frames 15 at the both sides. The wires 21, 22 are engaged with the upper and lower portions of a back side of the pressure receiving member 20 by the pawl portions 21n, 22n, thereby supporting the pressure receiving member 20. The wires 21, 22 are formed by steel wire rods having spring characteristics.

Among two of the wires 21, 22 which are locked to the pressure receiving member 20 in particular of the embodiment, the wire 21 positioned at the upper side is formed by a wire thinner than the wire positioned at the lower side. Therefore, the upper portion of the pressure receiving member 20 is easily moved further rearward compared to the lower portion thereof.

The wire 22 is formed by a thick wire rod, therefore having high rigidity and being not easily deformed when the seat is in a normal seated position. Accordingly, in a case where the seat is in the normal seated position, the upper portion of the pressure receiving member 20, which is supported by the wire 21 formed by the thin wire rod easily moves rearward and the rearward movement of the lower portion of the pressure receiving member 20, which is supported by the wire 22 formed by the thick wire rod is limited. As a result, when the seat is in the normal seated position, the upper portion of the pressure receiving member 20 is moderately depressed rearward while the lower portion of the pressure receiving member 20 supports the body of an occupant; thus, a seating feeling of the occupant does not deteriorate.

The wires 21, 22 are formed into bent or curved, substantially W-shapes or bow shapes, thereby being deformed by a load equal to or greater than a predetermined load. Accordingly, the pressure receiving member 20 is configured to move rearward with a larger travel distance.

As shown in FIG. 2, among two of the wires 21, 22 locked to the pressure receiving member 20 of the embodiment, both ends of the wire 21 locked to the upper portion of the pressure receiving member 20 are retained by attachment members 41 to be attached thereto. Both ends of the wire 22 locked to the lower portion of the pressure receiving member 20 are retained by attachment members 42 to be attached thereto. Both ends of the wire 22 correspond to connecting portions of the support member in the embodiments.

The attachment members 41 are arranged in positions of the side frames 15 at the both sides, which are close to lower ends of the upper frame 16. The attachment members 42 are attached to the lower portions of the right and left side frames 15 to be located above large-width portions of the side plates 15a.

Further, in the embodiment, the plate-shaped pressure receiving member 20 of resin and the wires 21, 22 are used as a pressure receiving member for supporting the cushion pad 1a from behind, but this is not limited thereto. An elastic member such as a publicly known S-spring, or a plate-shaped body of a strip-shaped metal or resin, configured so that at least a portion in the length distance is formed into a convoluted shape or the like, can be utilized as the pressure receiving member. Therefore, as in the embodiment, the pressure receiving member may be connected to the attachment members 41, 42 via connecting members such as wires. Alternatively, the pressure receiving member may be directly attached to the attachment members 41, 42.

Construction of Attachment Members

The attachment member 41 is a member to be used for locking the end of the upper wire 21 to the side frame 15. A substantially rectangular metallic plate is processed by bending, thereby forming the attachment member 41.

As shown in FIG. 2, the attachment member 41 includes: a side plate fixing portion which is provided at one end in the length direction to be fixed in contact with an inner surface of the side plate 15*a*; and a J-hook portion which is bent at a rear end of the side plate fixing portion to extend inward of the seat. The end of the wire 21 extending from the center in the seat width direction is locked to the J-hook portion.

Further, in the embodiment, the attachment member 41 is fixed only to the side plate 15*a*; however, it may be fixed to a corner portion of the rear end of the side plate 15*a*. In such case, the attachment member 41 may be configured to be bent from the side plate fixing portion to extend along a shape of an inner surface of a bent portion at the rear outer side of the side frame 15 and to include a rear edge portion fixing portion which is to be fixed in contact with the rear edge portion 15*c*, and the attachment member 41 may be fixed by welding also to the rear edge portion 15*c* via this rear edge portion fixing portion.

The attachment member 42 is a member to be used for locking the end of the lower wire 22 to the side frame 15. A substantially rectangular metallic plate is processed by bending, thereby forming the attachment member 42. The attachment member 42 integrally and continuously includes: a rear edge portion facing portion 42*a* facing a front surface of the rear edge portion 15*c* of the side frame 15; a first bent portion 42*b* bent at an obtuse angle relative to a flat surface portion of the rear edge portion facing portion 42*a*; a flange facing portion 42*c* formed by a flat plate-shaped portion extending from the first bent portion 42*b* forward and inward of the seat; a second bent portion 42*d* located on the opposite side from a side of the flange facing portion 42*c*, which is provided at the rear edge portion facing portion 42*a*, and bent in a direction opposite to the first bent portion 42*b* and at an obtuse angle relative to a flat surface of the flange facing portion 42*c*; and a locking portion 42*e* in which a flat plate-shaped inward extending portion 42*h* extends from the second bent portion 42*d* in a direction away from the rear edge portion facing portion 42*a* and an end of the inward extending portion 42*h* is curved in a direction opposite to the rear edge portion facing portion 42*a* into a J-shape.

Figure 5:
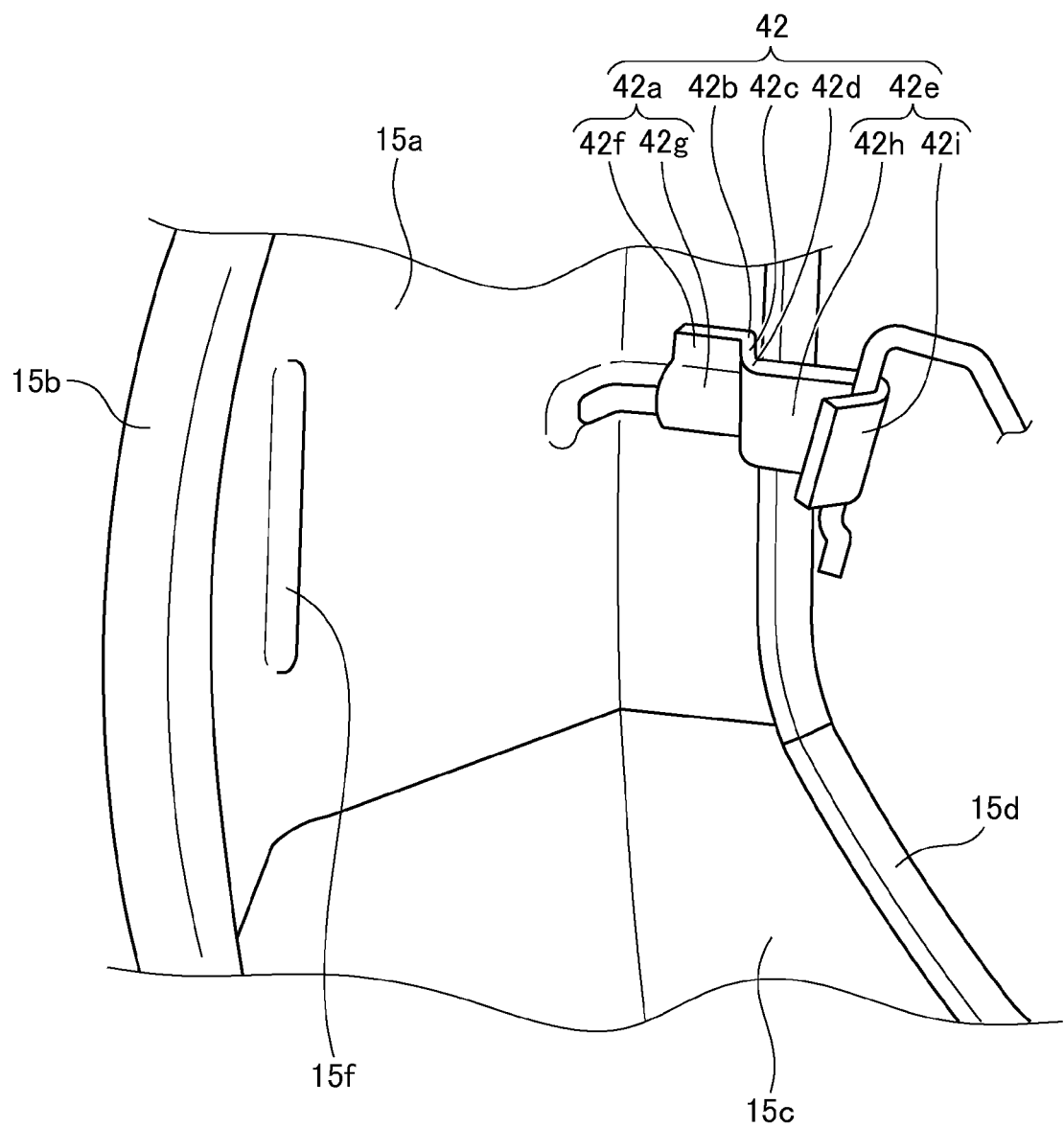
FIG. 5 is a front perspective view illustrating the positional relation between the fragile portion and the attachment member according to the embodiment of the present invention.
Figure 6:
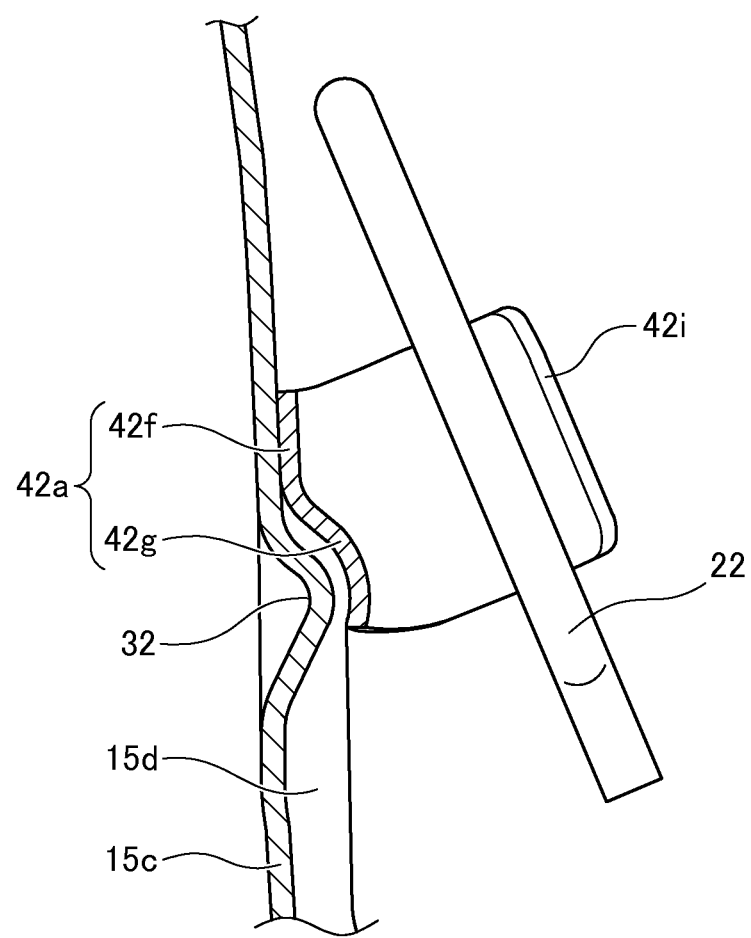
FIG. 6 is a cross-sectional explanatory view illustrating the positional relation between the fragile portion and the attachment member according to the embodiment of the present invention.

As shown in FIG. 5 and FIG. 6, the rear edge portion facing portion 42*a* is configured so that one end and the other end in the width direction of the attachment member 42 are respectively a fixation portion 42*f* of a flat plate shape and a curved portion 42*g* curved in the width direction of the attachment member 42. The curved portion 42*g* formed of an identical cross section in the length direction of the attachment member 42 has a shape as a cylinder extending along the length direction of the attachment member 42 is axially cut at two different cross sections.

Both the first bent portion 42*b* and the second bent portion 42*d* linearly extend. The first bent portion 42*b* and the second bent portion 42*d* are mutually inclined at the obtuse angles to depart from the curved portion 42*g* in the width direction of the attachment member 42.

The locking portion 42*e* formed by a J hook includes: the flat plate-shaped inward extending portion 42*h* extending from the second bent portion 42*d*; and an end portion 42*i* curved at and extending from an end of the inward extending portion 42*h* into a J-shape. The inward extending portion 42*h* and the end portion 42*i*, and the fixation portion 42*f* are mutually inclined at obtuse angles so that their lower portions are separated from one another.

In addition, the curved portion 42*g* is formed to continuously connect to the flange facing portion 42*c*.

As shown in FIG. 2 to FIG. 6, the attachment member 42 is attached to a position on a forward facing inner surface of the side frame 15 in the front to back direction of the seat, i.e., to the position in which the fragile portion 30 is arranged. The attachment member 42 is attached to a front surface of the side frame 15, which is the surface opposite to a direction in which an upper portion of the fragile portion 30 is inclined by bending at the time of a rear-end collision.

The attachment member 42 is arranged so that the rear edge portion facing portion 42*a*, the first bent portion 42*b*, and the flange facing portion 42*c* respectively face the rear edge portion 15*c*, a bent portion between the rear edge portion 15*c* and the flange portion 15*d*, and the flange portion 15*d*. In addition, the attachment member 42 is fixed by welding via the fixation portion 42*f* to a position which is above the fragile portion 30 of the rear edge portion 15*c* and adjacent to an upper end of the projected portion 32. The fixation portion 42*f* is arranged in the position kept away from the fragile portion 30 and is not fixed to the attachment member 42 in an area of the fragile portion 30 in order to restrain an increase of rigidity of the fragile portion 30.

As shown in FIG. 6, the fixation portion 42*f* and the first bent portion 42*b* are parallel to the rear edge portion 15*c*, and the second bent portion 42*d*, the inward extending portion 42*h*, and the end portion 42*i* are inclined at obtuse angles relative to the rear edge portion 15*c* so that their lower portions are separated from the rear edge portion 15*c*. In addition, the flange facing portion 42*c* is parallel to the flange portion 15*d*.

The locking portion 42*e* is configured to protrude further inward of the seat than the flange portion 15*d*, and the locking portion 42*e* is configured so that the wire 22 is locked at a position protruded further inward of the seat than the flange portion 15*d*.

In addition, the attachment member 42 is configured so that the fixation portion 42*f* is attached to the rear edge portion 15*c* and so that the flange facing portion 42*c* protrudes forward and inward extending along the flange portion 15*d*, and the attachment member 42 is subsequently bent inward again to protrude further inward of the seat than the side frame 15.

As shown in FIG. 6, the rear edge portion facing portion 42*a* is configured so that the fixation portion 42*f* of an upper portion thereof is fixed by welding to the rear edge portion 15*c* and so that the curved portion 42*g* of a lower portion thereof is a free end which is free from the rear edge portion 15*c*. In addition, the curved portion 42*g* is arranged to be separated by a gap generated between a portion of the projected portion 32, which is formed in the rear edge portion 15*c* and the curved portion 42*g*. The radius of curvature of the curved portion 42*g* is configured to be larger than the radius of curvature of the projected portion 32, but not limited thereto.

As shown in FIG. 4 and FIG. 5, the curved portion 42*g* is arranged in an overlapping manner so that a portion at an outer end covers a portion of the hole portion 31, which is provided in the rear edge portion 15*c* to be located at an inner end of the hole portion 31.

The attachment member 42 of the embodiment does not include a link mechanism or the like. Therefore, when the pressure receiving member 20 and the wire 22 are attached via the attachment member 42 to the side frame 15, the wire 22 is fixed to the side frame 15 in a state where a positional relation between a locking portion of the wire 22 and the side frame 15 is stable.

The fragile portion 30, the attachment member 42, and the pressure receiving member 20 are configured in the positional relations as described above; thereby, the side frame 15 is inhibited from being deformed in a complicated manner by a complicated input load such as bending, compression, and stretching, which is generated at the time of a rear-end collision or the like and a stable deformation mode of the side frame 15 can be realized.

That is, at the time of the rear-end collision or the like, firstly, an occupant is suddenly moved rearward by an inertia force and a load of the upper body of the occupant is applied to the pressure receiving member 20. The upper body of the occupant is inclined rearward by the elastic force of the wires 21, 22 connected to the pressure receiving member 20, and the force rearward of the seat is transmitted via the wires 21, 22 and the attachment member 42 to the side frame 15. The fragile portion 30 is arranged in the side frame 15; therefore, the forward curvature of the projected portion 32 of the fragile portion allows a portion of the side frame 15, which is above the hole portion 31, to bend rearward from the hole portion 31.

Modified Example of Attachment Member

Figure 7:
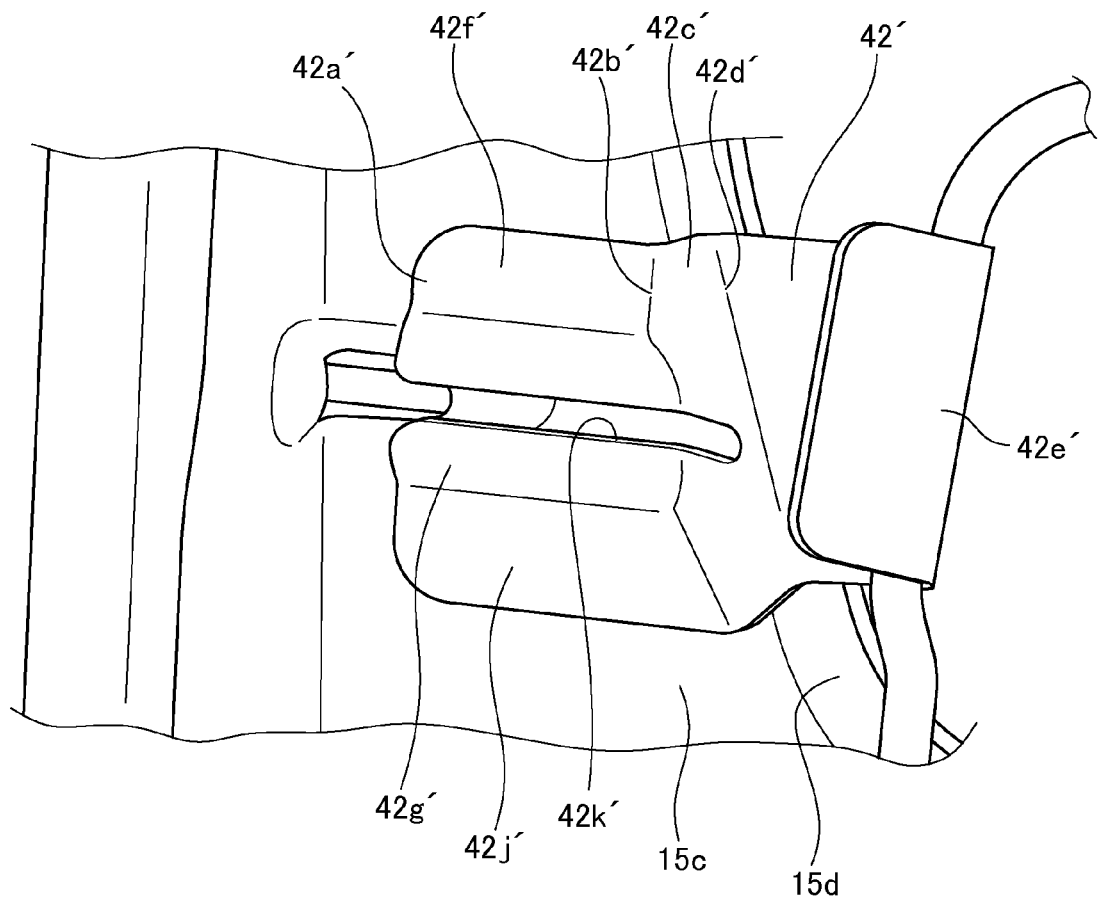
FIG. 7 is a front explanatory view illustrating a positional relation between the fragile portion and the attachment member according to a modified example of an embodiment.

As shown in FIG. 5 and FIG. 6, the attachment member 42 is fixed to the side frame 15 only by the portion thereof above the fragile portion 30; however, the attachment member 42 may be fixed to the side frame 15 by portions thereof above and below the fragile portion 30 as shown in FIG. 7.

In an example of FIG. 7, an attachment member 42' is provided with a pair of fixation portions 42f, 42j' at both sides of a curved portion 42g' in the width direction of the attachment member 42'.

Both the fixation portions 42f, 42j' are provided as flat plate-shaped portions at ends of the attachment member 42' in the width direction thereof. The substantially half-cylindrical curved portion 42g' protruding in a direction in which a flange facing portion 42c' protrudes is formed in a position sandwiched between the fixation portions 42f, 42j' in the width direction of the attachment member 42'. An axis of the half cylindrical shape of the curved portion 42g' extends along the length direction of the attachment member 42'.

A slit 42k' serving as a fragile portion of the attachment member 42' is formed in the curved portion 42g' to be located at the center in the width direction of the attachment member 42' in an extending manner along the axial direction of the half cylindrical shape of the curved portion 42g'. The slit 42k' extends from an end of the attachment member 42' in the length direction via the curved portion 42g' to a position of the flange facing portion 42c', which is adjacent to a second bent portion 42d'.

The slit 42k' is formed as described above. Accordingly, in a case where a portion of the side frame 15, which is above the fragile portion 30 is inclined rearward by the impact load, the attachment member 42' is also bent at the slit 42k' in the same direction as the portion of the side frame 15 is inclined. Therefore, an influence on an impact absorption effect of the fragile portion 30 can be inhibited.

In addition, a rear edge portion facing portion 42a' is configured so that the fixation portion 42j' as well as the fixation portion 42f and the curved portion 42g' are arranged in the width direction of the attachment member 42', therefore being wider than a locking portion 42e' to which the wire 22 is to be locked, in the width direction of the attachment member 42'. A lower end of the flange facing portion 42c' is inclined relative to the length direction of the attachment member 42' so that the second bent portion 42d' is located inward of a first bent portion 42b' in the width direction of the attachment member 42'.

As shown in FIG. 7, the attachment member 42' of the present example is arranged in a position from the rear edge portion 15c to the flange portion 15d of the side frame 15 so that the curved portion 42g' faces the projected portion 32 and so that the fixation portions 42f, 42j' are fixed by welding to positions of the rear edge portion 15c, which are above and below the projected portion 32 and between which the projected portion 32 is provided.

In this case, the slit 42k' faces a portion of the hole portion 31 in the front to back direction of the seat. Further, a portion of the slit 42k', which is provided in the flange facing portion 42c', and portions of the hole portion 31 and the projected portion 32, which are provided in the rear edge portion 15c, are formed on the same level in the up to down direction to face one another.

Upper and lower ends of the rear edge portion facing portion 42a' are arranged along the fragile portion 30. Such configuration facilitates deformation of the side frame 15 via the fragile portion 30, therefore increasing the impact absorption effect.

In the present example, as described above, the attachment member 42' is fixed by welding to two portions which above and below the fragile portion 30 and between which the fragile portion 30 is provided, therefore increasing the attachment strength of the attachment member 42'.

Other configurations of the present example are the same as those of the attachment member 42 and the seat S of the embodiment that are shown in FIG. 1 to FIG. 6, and therefore explanations thereof are omitted.

TABLE OF REFERENCE NUMERALS

| | |
|---|---|
| S | vehicle seat |
| S1 | seat back |
| S2 | seating portion |
| S3 | headrest |
| F | seat frame |
| 1 | seat back frame |
| 2 | seating frame |
| 1a, 2a, 3a | cushion pad |
| 1b, 2b, 3b | surface material |
| 15 | side frame |
| 15a | side plate |
| 15b | front edge portion |
| 15c | rear edge portion |
| 15d | flange portion |
| 15e | widened portion |
| 15f | bead |
| 16 | upper frame |
| 16a | side portion |
| 17 | lower frame base portion |
| 18 | lower frame horizontally spanned portion |
| 19 | headrest pillar |
| 19a | pillar supporting portion |
| 20 | pressure receiving portion |
| 21, 22 | wire |
| 21n, 22n | pawl portion |
| 30 | fragile portion |
| 31 | hole portion |
| 32 | projected portion |
| 41, 42, 42' | attachment member |
| 42a, 42a' | rear edge portion facing portion |
| 42b, 42b' | first bent portion |
| 42c, 42c' | flange facing portion |
| 42d, 42d' | second bent portion |

-continued

TABLE OF REFERENCE NUMERALS

| 42e, 42e' | locking portion |
| 42f, 42f', 42j' | fixation portion |
| 42g, 42g' | curved portion |
| 42h | inward extending portion |
| 42i | end portion |
| 42k' | slit |

The invention claimed is:

1. A seat frame of a vehicle seat, comprising:
side frames positioned at right and left sides of a seat back frame to extend in an up to down direction,
wherein:
each of the side frames comprises:
a side portion extending along a side portion of the seat;
a rear portion protruding from a rear end of the side portion to an inner side of the seat; and
a support member spanned between the side frames at the right and left sides to receive a load of a seated person, which is applied onto a backrest;
the support member comprises a connecting portion for connecting to the side frame, the support member being attached to the rear portion of the side frame in a state where a positional relation between the connecting portion and the side frame is fixed;
an attachment member for connecting the connecting portion of the support member is arranged at the rear portion; and
the attachment member protrudes further to the inner side of the seat than the rear portion, and a support member connecting portion to which the support member is to be attached is arranged at a protruding portion of the attachment member.

2. The seat frame of the vehicle seat according to claim 1, wherein the attachment member comprises:
a side frame fixing portion to be fixed to the rear portion of the side frame;
a forward extending portion curved at and extending from an inner end of the side frame fixing portion to a front side of the seat; and
an inward extending portion extending from an end of the forward extending portion to the inner side of the seat, the end being in the opposite direction from the side frame fixing portion.

3. The seat frame of the vehicle seat according to claim 2, wherein:
the rear portion comprises a forward protruding flange portion provided at an inner end of a surface extending in a seat width direction; and
the forward extending portion protrudes to the front side of the seat along the flange portion and is extended further to the front side of the seat than a front end of the flange portion, the forward extending portion being bent at a front side of the front end of the flange portion to continuously connect to the support member connecting portion.

4. A vehicle seat comprising:
side frames positioned at right and left sides of a seat back frame to extend in an up to down direction,
wherein:
each of the side frames comprises:
a side portion extending along a side portion of the seat;
a rear portion protruding from a rear end of the side portion to an inner side of the seat; and
a support member spanned between the side frames at the right and left sides to receive a load of a seated person, which is applied onto a backrest;
the support member comprises a connecting portion for connecting to the side frame, the support member being attached to the rear portion of the side frame in a state where a positional relation between the connecting portion and the side frame is fixed;
an attachment member for connecting the connecting portion of the support member is arranged at the rear portion; and
the attachment member protrudes further to the inner side of the seat than the rear portion, and a support member connecting portion to which the support member is to be attached is arranged at a protruding portion of the attachment member.

* * * * *